Nov. 8, 1932.  C. DE GANAHL  1,887,148
AEROPLANE PROPULSION
Filed May 2, 1930  3 Sheets-Sheet 1
Fig.1
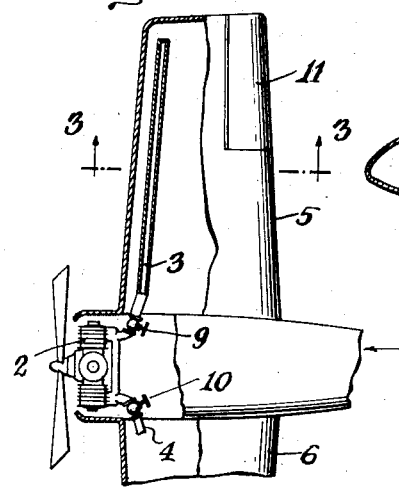
Fig.2
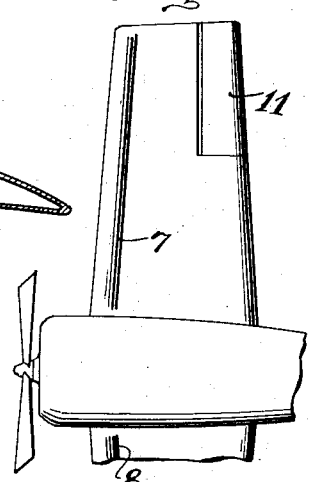
Fig.3
Fig.4
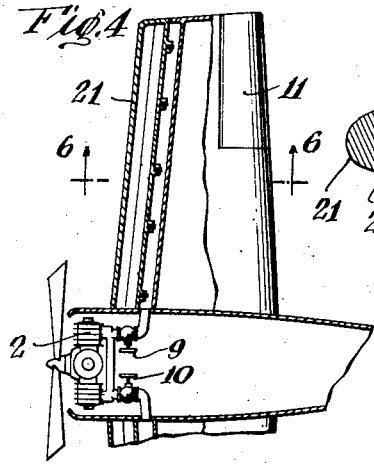
Fig.6
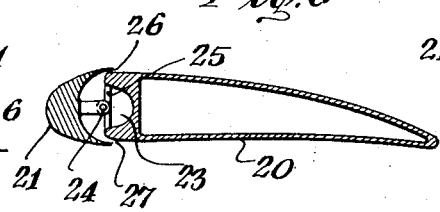
Fig.5
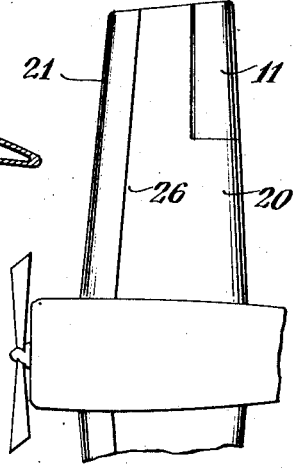
Fig.7
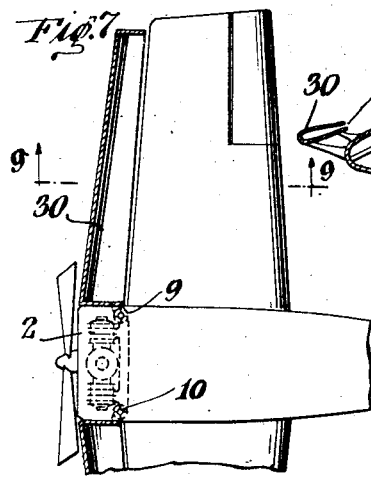
Fig.9
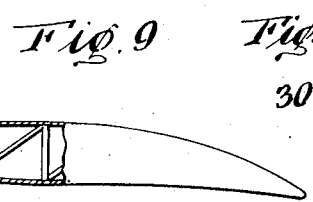
Fig.8
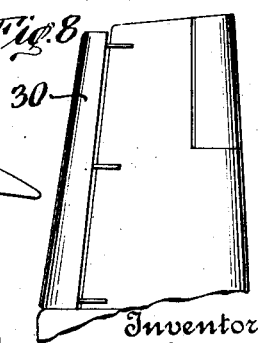
Inventor
Carl De Ganahl
By his Attorney
Louis Burgess Nov. 8, 1932.  C. DE GANAHL  1,887,148
AEROPLANE PROPULSION
Filed May 2, 1930   3 Sheets-Sheet 2
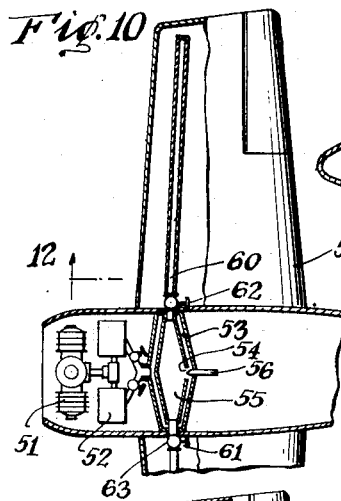
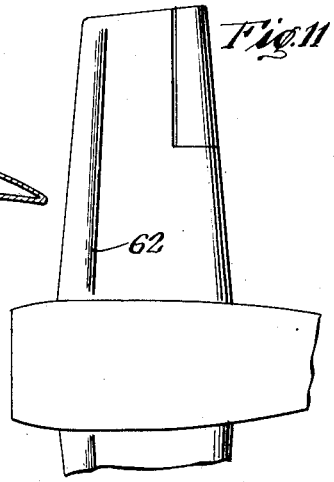
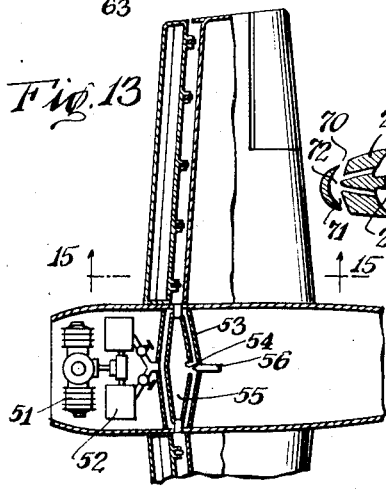
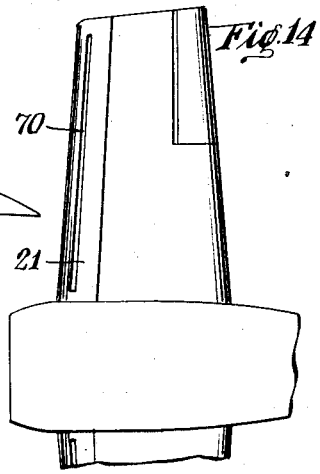
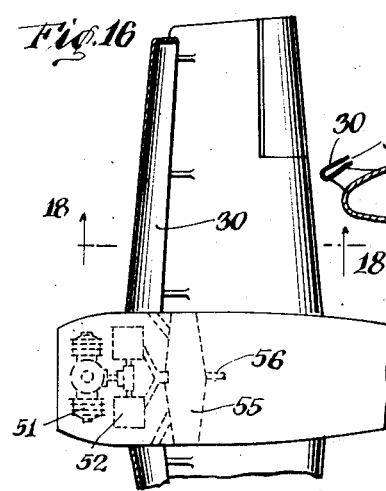
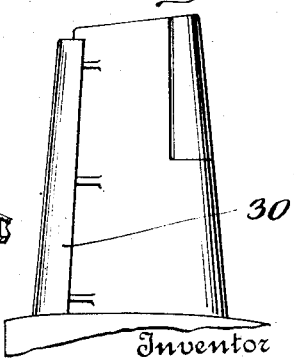
Inventor
Carl De Ganahl
By his Attorney
Louis Burgess Nov. 8, 1932.     C. DE GANAHL     1,887,148
AEROPLANE PROPULSION
Filed May 2, 1930     3 Sheets-Sheet 3
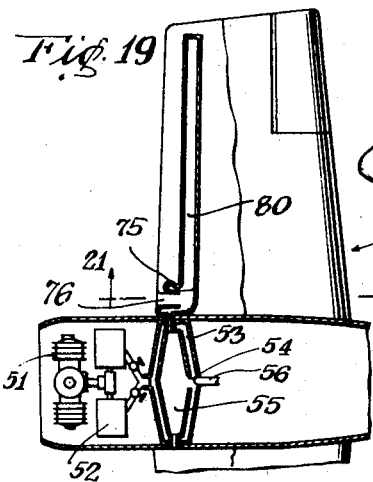
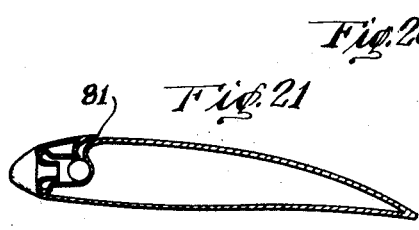
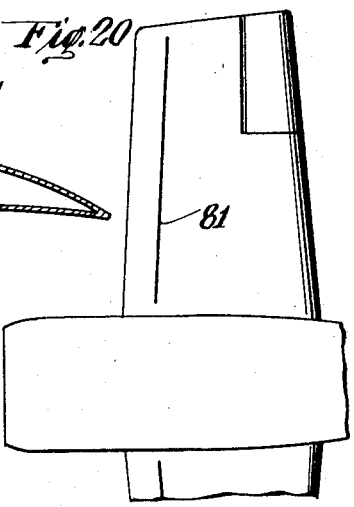
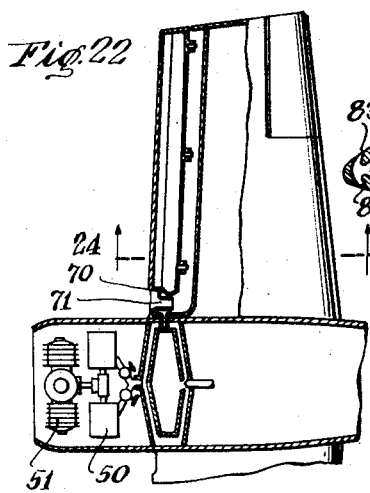
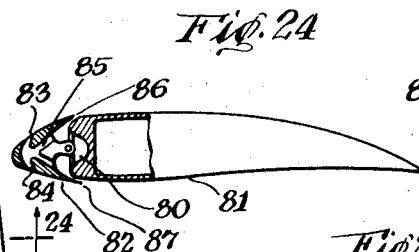
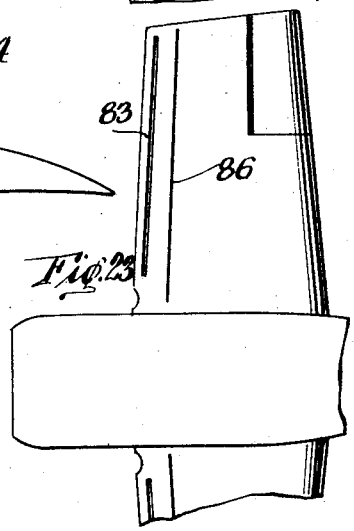
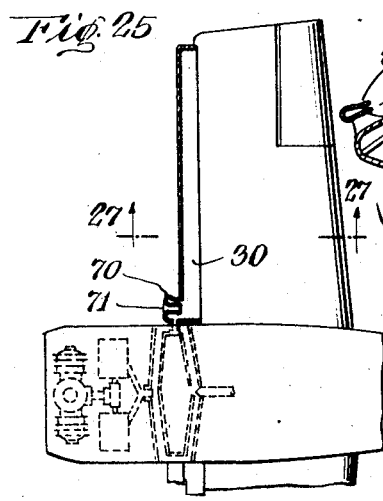
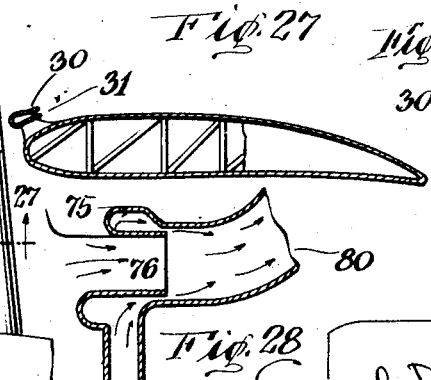
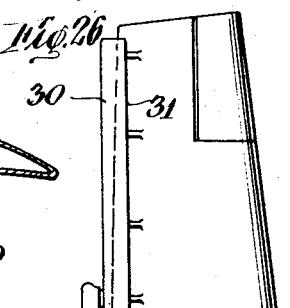

Patented Nov. 8, 1932

1,887,148

UNITED STATES PATENT OFFICE

CARL DE GANAHL, OF GARDEN CITY, NEW YORK

AEROPLANE PROPULSION

Application filed May 2, 1930. Serial No. 449,232.

This invention relates to aeroplane propulsion means and will be fully understood from the following description read in conjunction with the drawings, in which, Fig. 1 is a horizontal section through an embodiment of my invention.

Fig. 2 is a top view of the construction shown in Fig. 1.

Fig. 3 is a cross-section through the construction shown in Fig. 1 on the plane indicated by III—III.

Fig. 4 is a horizontal section through an alternative embodiment of my invention.

Fig. 5 is a top view of the construction shown in Fig. 4.

Fig. 6 is a vertical section through the construction shown in Fig. 4 on the plane indicated by VI—VI.

Fig. 7 is a top view with parts in section of an alternative embodiment of my invention.

Fig. 8 is a top view of part of Fig. 7.

Fig. 9 is a vertical section through the construction shown in Fig. 7 on the plane indicated by IX—IX.

Fig. 10 is a horizontal section through an alternative embodiment of my invention.

Fig. 11 is a top view of the construction shown in Fig. 10.

Fig. 12 is a vertical section through the construction shown in Fig. 10 on the plane denoted by XII—XII.

Fig. 13 is a horizontal section through an alternative embodiment of my invention.

Fig. 14 is a top view of the construction shown in Fig. 13.

Fig. 15 is a vertical section through the construction shown in Fig. 13 on the plane indicated by XV—XV.

Fig. 16 is a horizontal section through an alternative embodiment of my invention.

Fig. 17 is a top view of part of Fig. 16.

Fig. 18 is a vertical section through Fig. 16 on the plane denoted by XVIII—XVIII.

Fig. 19 is a horizontal section through an alternative embodiment of my invention.

Fig. 20 is a top view of the construction shown in Fig. 19.

Fig. 21 is a vertical section through the construction shown in Fig. 19 on the plane denoted by XXI—XXI.

Fig. 22 is a horizontal section through an alternative embodiment of my invention.

Fig. 23 is a top view through the construction shown in Fig. 22.

Fig. 24 is a vertical section through the construction shown in Fig. 22 on the plane denoted by XXIV—XXIV.

Fig. 25 is a horizontal section through an alternative embodiment of my invention.

Fig. 26 is a top view of part of the construction shown in Fig. 25.

Fig. 27 is a vertical section through the construction shown in Fig. 25 on the plane denoted by XXVII—XXVII.

Fig. 28 is a cross-section through part of Fig. 25.

My invention relates to propulsive devices for aeroplanes and may constitute either the sole propulsive means therefor, or a propulsive means to be employed in combination with other propulsive devices. In addition to furnishing either the sole or partial propulsion for the plane, my device is capable of furnishing directional control of diminishing flight resistance and of rendering possible the attainment of greater efficiencies and speeds than have heretofore been realized. Other advantages of the invention will be apparent from the following description.

My invention relates generally to a propulsive means actuated by rearwardly directed jets of gas such as, for example, combustion gases. I am aware that jets and sheets of gases have been heretofore indicated for this purpose. Such disclosures have, however, been limited in the main either to the use of gases at relatively low pressures through relatively wide slots or jets. In the few cases in which gases at high pressures have been generated for this purpose, the jets have been of such dimensions that only a small fraction of the available energy could possibly be converted into propulsive energy and commercial development along the lines disclosed would have been practically impossible. I have discovered that certain conditions must obtain if propulsion by rearwardly directed gases is to be successfully and economically maintained, and such conditions have, so far as I am aware, not been appreciated or disclosed. In general, I may state that the gases must be ejected in a direction having a principal rearward component through slots or orifices of relatively small dimensions. If orifices are used, the maximum diameter should not exceed ⅛ inch and for best results should not exceed 1/16 inch. If the gases are ejected through a slot, the opening therein should not exceed ⅛ inch in width and for best results should not exceed 1/16 inch. The gases are, of course, supplied to the jets or slots through conduits of suitable type and in addition certain pressures must obtain within the conduit. I have found that a pressure of at least 10 pounds gage is necessary for this purpose, and pressures of 30 pounds or more are desirable for satisfactory propulsion. The propulsive efficiency is markedly enhanced by the maintenance of the conditions outlined, and it is only through the maintenance of these conditions that propulsion can be successfully accomplished with fuel ratios which are commercially practicable. I prefer to eject the gases through slots which are rearwardly directed and which are near the leading edge of the wing. In this manner, in combination with the conditions outlined as to pressures and slot dimensions, I am enabled to practically surround the wing with currents of air which are flowing in parallel relationship thereto, thereby minimizing the flight resistance due to turbulence, eddy-currents, etc. In particular, I find that the use of slots which parallel the leading edge of the wing and which discharge adjacent the upper surface thereof increases the vacuum obtaining adjacent the upper surface of the wing and renders possible the maintenance of lift ratios greatly in excess of any heretofore realized.

In Fig. 1, I have illustrated a form of my invention which is susceptible of use in combination with the propulsive means heretofore employed and which adds markedly to both efficiency and propulsion and ease of control.

The aeroplane 1 is powered by motor 2 which may be of the conventional internal combustion type. The exhaust from 2 is conducted into the conduits 3 and 4 which extend through the wings 5 and 6 preferably parallel the leading edge. The conduits communicate with the ducts 7 and 8 which discharge in a general rearward direction adjacent the upper wing surface. These slots are relatively narrow and in this case should not exceed 1/16 inch and preferably are materially narrower. The engine does not exhaust at atmospheric pressures but at a pressure maintained within ducts 3 and 4 of at least 10 pounds to the square inch. The effect of this construction is to distribute a sheet of combustion gases at high velocity over the upper surface of the wings, materially diminishing flight resistance and simultaneously increasing propulsion efficiency. Flow to either duct 3 or 4 may be differentially controlled by valves 9 and 10. These are only diagrammatically indicated but will be connected through suitable control means to a stick available to the operator of the plane inasmuch as the excess of gases to any side causes a corresponding lift by increasing the vacuum above the wing on that side, thereby permitting the operations of banking and the corresponding control of the flight of the plane. Conventional ailerons 11 may be provided in addition.

The set-up shown in Figs. 4 to 6 inclusive utilizes the exhaust of the motor in the same way, but in this case the slots are not fixed as to dimensions and position. Instead, the duct which transports the exhaust gases to the slots is defined by the wing 20 and a nose-piece 21; the duct 23 comprising the space therebetween. The nose-piece 21 is articularly connected to the wing so that it may be rocked about an axis 24 which parallels the leading edge of the wing. 24 is carried by a series of vertical straps 25 which are vertically spaced at intervals along the front of the main wing portion 20. By examination of Fig. 6, it will be apparent that by rocking the nose portion 21 a slot 26 may be caused to form adjacent either the upper surface of the wing, or alternatively, a slot 27 may be formed adjacent the lower surface of the wing. If the slot is formed adjacent the upper surface, the lift is increased as a greater vacuum is formed adjacent the upper surface. If the slot is caused to form adjacent the lower surface, the wing tends to drop as the vacuum is correspondingly increased adjacent the lower surface. By setting the nose portion 21 to eject the gases equally adjacent both surfaces, propulsive effects only may be obtained to any desired degree. Rocking the nose portion 21 has certain other advantageous effects inasmuch as it tends simultaneously to alter the mass velocity of the air directed over ether wing surface, thereby enhancing the effect of the ejected gases.

Fig. 7 shows an alternative form in which the duct which carries the exhaust gases is not internal to the wing; but in this case duct 30 is provided which is spaced from the wing and which discharges through slot 31 connected thereto. The general instructions with respect to slot dimensions and duct pressures must of course be observed with this construction as well as with the preceding types of construction.

The preceding figures have shown my invention applied to the partial propulsion of the plane. It may also constitute the sole propulsive device, and such construction is illustrated in the succeeding figures. In Fig. 10, for example, the plane 50 carries no propeller and the engine 51 operates to drive compressor 52 to provide a supply of compressed air under pressures in excess of 10 pounds to the square inch. The motor 51 is preferably located adjacent the nose of the ship to facilitate cooling and may be of the internal combustion type. The compressed air passes through the jacket 53 and discharges through duct 54 into the combustion chamber 55. It will be preheated in passage through jacket 53. Simultaneously, a jet of fuel is introduced to 55 through the nozzle 56. The fuel will, of course, be introduced under a pressure at least equal to that obtaining in the combustion chamber 55. Combustion may be initiated in any suitable way and will thereafter be spontaneously maintained by continuing the supply of fuel and air. Provision should be made for the combustion in chamber 55 of a supply of fuel substantially equal to that required with the usual propulsion devices now available. This will provide ample capacity for starting, and the supply may be thereafter diminished by suitable control valves to maintain any appropriate speed. The combustion chamber 55 discharges into conduits 60 and 61, which are connected to ducts such as 62, preferably running parallel to the leading edge of the wing. The control of the plane may be maintained as heretofore described by differential control of flow through ducts 60 and 61 effected, for example, by valves conventionally indicated by 62 and 63, which will of course be carried through suitable means to a point at which the operator may control the same.

The foregoing propulsion device may be combined with the nose portion heretofore shown in Figs. 4, 5 and 6. In this case, I find it advisable to provide in addition fixed slots 70 and 71 adjacent the tip of the nose portion, which slots are supplied with gases through duct 72 communicating with duct 23. The purpose of the fixed slots 71 and 72 is to minimize eddy-currents and flight resistance adjacent the nose 21 of the plane, and thereby reduce the flight resistance of the wing as a whole to the absolute minimum. Provision will, of course, be made in this case for rocking the nose portion 21 to open the slot 26 adjacent the upper surface of the wing, or conversely to open the slot 27 adjacent the lower surface of the wing, and such means is preferably designed so that this effect may, if desired, be differentially applied to the nose portions on either side of the ship so that the lift of one wing is accompanied by a corresponding drop in the opposite wing, and conversely. This device may also be employed in combination with a conduit which is not formed within the wing itself, but is spaced therefrom; and in this case the combustion gases may pass through conduit 30 which is spaced from the wing and carried thereby, and the gases may be ejected through slot 31.

With the device indicated in Figs. 10 to 18 inclusive the combustion gases are at relatively high temperatures and for this reason all metal construction is preferred, while the ducts which carry these gases should be constructed of special alloys designed to retain form and strength under the essential operating conditions.

The device shown in Figs. 19 et seq. utilizes the same means for generating the combustion gases; but instead of discharging the combustion gases in undiluted form through the slots, the said gases are utilized to generate a large quantity of gases at somewhat reduced pressure. The pressure obtaining in the conduits should still be in excess of 10 pounds gage and for best results should be in excess of 30 pounds gage, but the combustion products are generated at relatively higher pressures and are discharged through a relatively thin annular slot 75 which surrounds an inlet 76 preferably facing forward of the plane. In this way, the combustion gases operate to drive a large quantity of air under pressure into the duct 80 from which the air and combustion gases mixed therewith may be discharged through slot 81. In this case, owing to the larger volume of the gases issuing from the slot, a width of 1/8 inch may be tolerated, although pressures within duct 80 should be maintained at not less than 10 pounds per square inch.

In the construction shown in Figs. 22, 23 and 24, the duct 80 which carries the gases to the slot is defined by wing portion 81 and nose portion 82 which is articularly connected to 81. Fixed slots 83 and 84 are preferably provided in addition and these are supplied with air admixed with combustion gases through duct 85 communicating with duct 80. Nose portion 82 is operated in the same manner as nose portion 21 heretofore described.

This type of construction may also employ a conduit such as 30 which is spaced from the wing, and in this case the structure is appropriately modified so that the air and combustion gases pass into conduit 30. By rocking nose portion 82 a slot 86 may be formed adjacent the upper wing surface, or alternatively, a slot 87 may be formed adjacent the lower wing surface.

In Fig. 28, I have shown an enlarged sectional view of the device by which the combustion gases operate to create a relatively large volume of gas at lower temperatures, and pressure in the duct leading to the propulsion slots. There are various arrangements by which the gases at high pressure and temperature may be made to accomplish this purpose and any such devices may be alternatively substituted for the device shown. While I have shown one discharge slot in either the upper or lower wing surface, it will of course be understood that several such slots may be employed and in this case the slots are preferably arranged in parallel. Flow to the additional slots may also be controlled by the operator to modify the direction of flight of the plane.

Inasmuch as my invention is susceptible of embodiment in numerous forms other than those specifically disclosed, it is my intention that the invention be limited only by the appended claims or their equivalents in which I have endeavored to claim broadly all inherent novelty.

I claim:

1. An aeroplane comprising wings having main body portions and nose portions articularly connected to said main body portions and adapted to rock about an axis transverse to the chord of said wings, said main body portions and said nose portions defining longitudinal conduits for gases under pressure, said nose portions having upper and lower surfaces overlapping the surfaces of said main body portions, whereby a relatively narrow slot adjacent either the upper or lower surface of said wings may be formed by rocking said nose portions.

2. An aeroplane comprising a fuselage, wings projecting on either side of the fuselage, said wings having main body portions and nose portions articularly connected thereto, adapted to rock about an axis transverse to the chord of said wings, said main body portions and said nose portions defining a conduit therebetween for gases under pressure, said nose portions having portions adapted to overlap both the upper and lower surfaces of said main body portions, and adapted to form therewith a relatively narrow slot adjacent either the upper or lower surface of said wings, and means for controllably rocking the nose portions of either side of said fuselage either differentially or in unison.

3. Apparatus according to claim 1, comprising in addition fixed slots adjacent the leading edge of said nose portions and a gas conduit connecting therewith.

CARL DE GANAHL.